Aug. 31, 1954      E. G. HILLS      2,688,083

MULTIFREQUENCY ANTENNA

Filed Sept. 1, 1950      5 Sheets-Sheet 1

INVENTOR.
Elmer G. Hills
BY Mason, Kolehmainen, Rathburn & Wyss
Att'ys

Aug. 31, 1954
E. G. HILLS
2,688,083
MULTIFREQUENCY ANTENNA
Filed Sept. 1, 1950
5 Sheets-Sheet 2
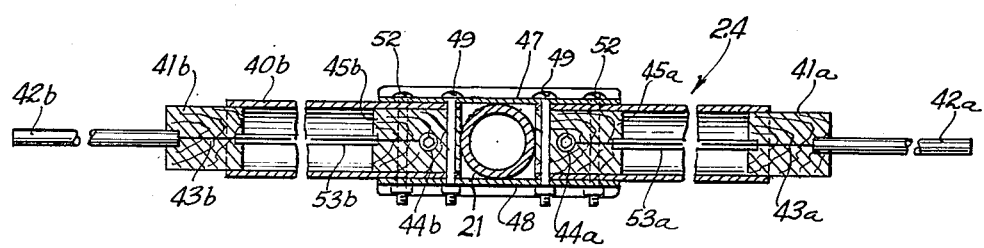
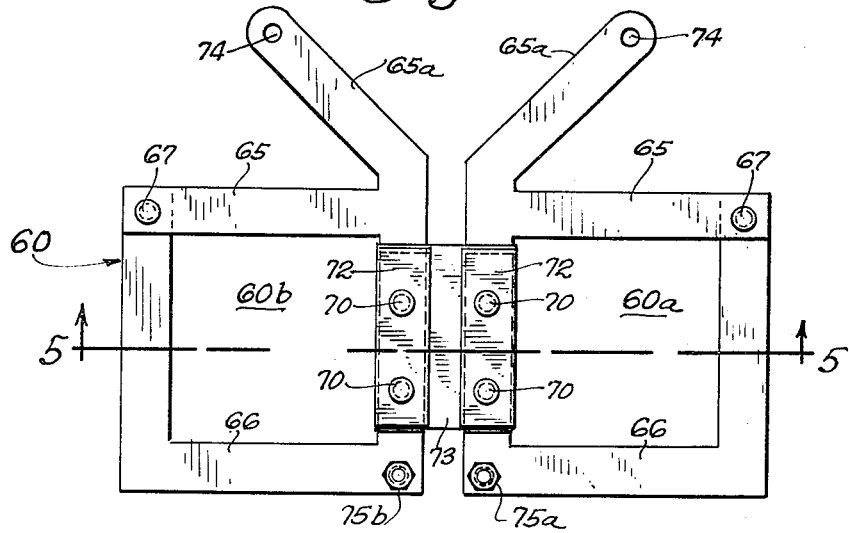
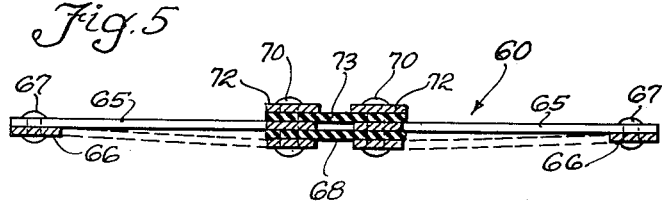
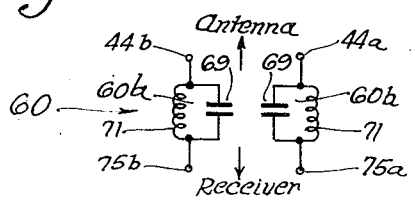
INVENTOR.
Elmer G. Hills
BY Mason, Kolehmainen,
Rathburn & Wyss
Attys Aug. 31, 1954 E. G. HILLS 2,688,083
MULTIFREQUENCY ANTENNA
Filed Sept. 1, 1950 5 Sheets-Sheet 3

$1\frac{1}{2}\lambda$ Dipole Current

Current of Fed Element 24 on High Frequency Television Band

INVENTOR.
Elmer G. Hills
BY
Mason, Kolehmainen, Rathburn & Wyss
Att'ys

Aug. 31, 1954 E. G. HILLS 2,688,083
MULTIFREQUENCY ANTENNA
Filed Sept. 1, 1950 5 Sheets-Sheet 4

Channel 2

Channels 3, 4 & 5

Channel 6

Channels 7, 8 & 9

Channels 10 & 11

INVENTOR.
Elmer G. Hills
BY Mason, Kolehmainen, Rathburn & Wyss
Att'ys

Aug. 31, 1954     E. G. HILLS     2,688,083
MULTIFREQUENCY ANTENNA
Filed Sept. 1, 1950     5 Sheets-Sheet 5

Channels 12 & 13

INVENTOR.
Elmer G. Hills

Patented Aug. 31, 1954

2,688,083

UNITED STATES PATENT OFFICE 2,688,083

MULTIFREQUENCY ANTENNA

Elmer Guy Hills, Chicago, Ill., assignor of one-half to Joseph N. Marks, Julius Tunkl, I. Rosenthal, and E. Lichtenstein, doing business as Tricraft Products Co., Chicago, Ill.

Application September 1, 1950, Serial No. 182,686

9 Claims. (Cl. 250—33.57)

1

The present invention relates to a multifrequency antenna especially well adapted for use with frequency modulation and television and more particularly to an antenna especially adapted for use as an outdoor television antenna capable of satisfactory operation with all twelve channels in the two presently assigned television bands.

At present in the United States television broadcasting is confined to two bands extending from 54 megacycles to 88 megacycles for the first band, and from 174 megacycles to 216 megacycles for the second band. These two bands are referred to hereinafter as the low frequency and high frequency television bands respectively. Each band is divided into a plurality of channels 6 megacycles in width. The present channels and the frequency limits are as follows:

| Channel Number | Frequency Limits | |
|---|---|---|
| 2 | 54–60 mc. | Low Frequency Television Band. |
| 3 | 60–66 mc. | |
| 4 | 66–72 mc. | |
| 5 | 76–82 mc. | |
| 6 | 82–88 mc. | |
| 7 | 174–180 mc. | High Frequency Television Band. |
| 8 | 180–186 mc. | |
| 9 | 186–192 mc. | |
| 10 | 192–198 mc. | |
| 11 | 198–204 mc. | |
| 12 | 204–210 mc. | |
| 13 | 210–216 mc. | |

Receiving antennas for television signals, as is well understood by those skilled in the art, are far more critical than those for sound broadcasting. The principal problem in connection with television receiving antennas resides in the avoidance of reflected signals either from nearby structures or within the antenna system itself. Consequently, television antennas are generally designed so that the path difference with respect to reflected or direct television signals reaching the antenna cannot be greater than fifty feet. If the path difference is greater than fifty feet, a substantial degradation of picture detail results and if the path difference is sufficiently great, a double image results. Moreover, the conventional type of long wire receiving antenna and the conventional lead-in wire would not have a narrow beam as is desired for a television antenna. Reflections can, of course, be prevented by proper design and by loading the antenna. Television receiving antennas have heretofore usually comprised a short dipole or two short dipoles, one for each of the two television bands with a single reflector for each, and the lead-in

2 conductor has the form of a transmission line that has no signal pick up. The signal absorption is thereby restricted to the dipole elements within which significant signal reflections do not occur.

As is well known, the theoretical maximum gain obtainable with a single dipole and reflector is 5.5 decibels. As frequency is decreased below the frequency at which this gain occurs for a given antenna, the forward gain in decibels rapidly decreases and becomes negative with the antenna receiving best from the rear direction. As the frequency is increased above the frequency of maximum gain, the decibel gain remains positive, but decreases with increasing frequency. It would be desirable to provide a high gain antenna with a minimum of inexpensive parts which would give a substantial gain over the conventional half wave dipole, which would receive adequately the signals from all channels of both presently assigned television bands and which would receive from the same direction at all frequencies.

Accordingly, it is an object of the present invention to provide a new and improved multifrequency antenna especially adapted for use on FM and television.

It is another object of the present invention to provide an antenna comprising a minimum of parts, inexpensive to manufacture, which will give a substantial gain over presently known antennas of anywhere comparable cost.

It is another object of the present invention to provide an improved antenna particularly well designed for television reception which receives both presently assigned television bands and which receives all signals from channels in these bands in the same direction.

Still another object of the present invention is to provide an improved television antenna having a feed arrangement such that a good impedance match to a 300 ohm transmission line is obtained for both television bands.

Still another object of the present invention is to provide an extremely economical television antenna including a matching network formed of simple, easy to manufacture parts which is sturdy and foolproof in operation and which will give long years of satisfactory service.

Still another object of the present invention is to provide a unidirectional frequency modulation and television antenna, mechanically designed for maximum strength to give long and heavy duty service, which is capable of easy and quick installation, which has high gain and which gain is relatively uniform for each television band.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

Fig. 3 is a cross sectional view through the fed element group of the antenna of Fig. 1 which, incidentally, may be employed by itself to provide an extremely economical antenna;

Fig. 4 is an enlarged view of the matching network employed with the fed element group of the antenna shown in Figs. 1 and 2;

Fig. 5 is a sectional view taken on line 5—5 of Fig. 4;

Fig. 6 is a schematic circuit diagram of the matching network of Fig. 5;

Figs. 12, 13, 14, 15, 16 and 17 are reception patterns of the antenna of the present invention with respect to the presently assigned television channels.

The antenna of the present invention which is particularly well adapted as an outdoor unidirectional, frequency modulation and television antenna receives in both presently assigned television bands and from the same direction at all frequencies. The antenna incorporates in a single bay, seven elements and the design is such that in the high television band, three colinear elements arranged as a single element group are fed with equal in-phase currents so that this single element group gives a gain of six decibels over a half wave dipole. Behind this single element group are two colinear reflectors effective only in the high frequency television band. In the low television band, the three fed element group acts as a single half wave dipole. A director and reflector are provided for the low frequency television band and this last mentioned reflector also functions for part of the high frequency television band. In the high frequency television band with the addition of the three reflectors, the resultant antenna gain is nearly ten decibels over a half wave dipole and this gain is over the entire high television band. In the low band, the reflector is cut to give maximum forward gain in channel 2 and the director placed in front of the fed element group is cut to give maximum forward gain in channel 6. As a result, the antenna gain is nearly constant over the entire low television band with a gain of approximately six decibels over a conventional half wave dipole for the entire low band. A matching network of unusually simple parts is provided to provide the desired impedance match.

Figure 1:
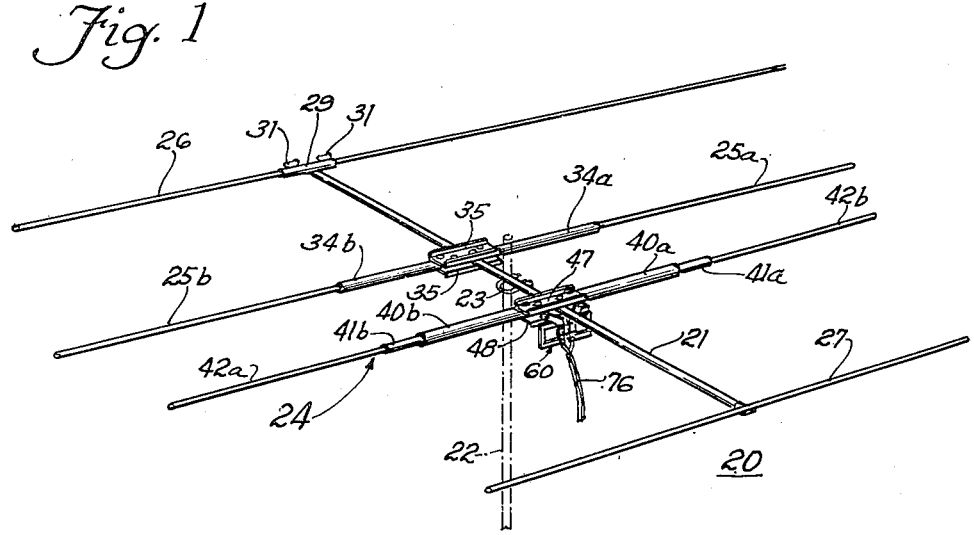
Fig. 1 is a perspective view of a multi-element unidirectional frequency modulation and television antenna embodying the present invention.

Referring now to the drawings, there is illustrated in Fig. 1 the antenna of the present invention generally designated at 20 which comprises a horizontal mast 21 adapted to be supported from a suitable vertical mast 22 by clamping means generally designated at 23. Mounted on the horizontal mast 21 is the three fed element group generally designated at 24, which, incidentally, may be used by itself as will become apparent from the following description, as well as a pair of high band reflectors 25a and 25b, a high and low band reflector 26, and a low band director 27. The elements 25a, 25b, 26 and 27 are parasitic elements and the reflector elements 25a, 25b and 26 are behind the fed element group 24. The director element 27 is ahead of the fed element group 24. To mount the reflector element 26, the horizontal mast 21 has riveted thereto a short section of tubular material generally designated by the reference numeral 29 which may be riveted to the end of the horizontal mast 21 as indicated at 30 to form a sort of a T. The reflector 26 may be inserted within the tubular section 29 and attached thereto by bolts having wing nuts 31. If desired, the reflector 26 may comprise two separate elements having their adjacent ends inserted into tubular element 29. In any event, for shipping and packing purposes it is desirable to be able to fold or disassemble the reflector 26 from the horizontal mast 21. This element 26 is positioned 15/100 of a wave length behind the fed element group 24 for the low frequency band and of such length as to be inductive and hence act as a reflector. Furthermore, the reflector element 26 is chosen to be of such length as to be tuned to give maximum gain at the low end of the low frequency television band. This reflector element 26 also functions in the high frequency television band where it is longer than 1.5 wave and hence is inductive.

Figure 18:
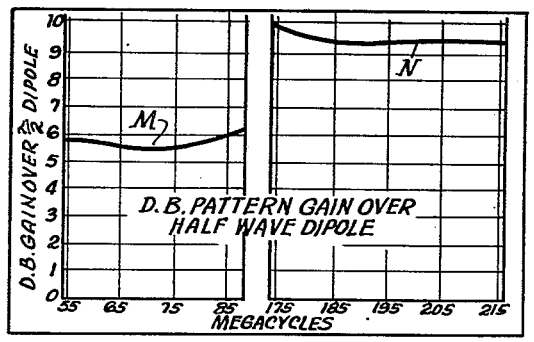
Figs. 18 and 19 are curve diagrams depicting certain characteristics of the antenna of the present invention for both television bands.

In accordance with the present invention, the element 27 is cut so as to be shorter than a half wave in the low frequency band so as to be capacitive and hence act as a director. As illustrated, this director is suitably riveted to the opposite end of the horizontal mast 21 from the end to which reflector 26 is attached and is disposed perpendicular to mast 21. Element 27 by being of proper length is thereby tuned so as to give maximum gain at the high end of the low frequency television band. As was mentioned above, the reflector element 26 is chosen as of such length to give maximum gain at the low end of the low frequency television band. By this arrangement, the combined action of elements 26 and 27 causes the gain over the low frequency television band to be substantially uniform, as indicated by the curve M in Fig. 18 of the drawings. The reason for this arrangement is that at frequencies below those for best operation of a reflector and above those for best operation of a director, the parasitic elements 26 and 27 do more damage than if they were not present in the antenna. However, for frequencies above those for best reflector operation and below those for best director operation, the effectiveness of the parasitic elements decreases, but is still better than if they were not present.

For the purpose of providing reflector action for signals in the high frequency television band, the two high band reflectors 25a and 25b are provided which are supported 15/100 of a wave length behind the fed element group 24 described in detail hereinafter. As illustrated, the reflector elements 25a and 25b are formed of a suitable metal such, for example, as aluminum rods, the ends of which are supported by suitable insulating rods or members 34a and 34b. The insulating rods 34a and 34b are illustrated as being supported from the horizontal mast 21 by means of suitable gusset plates 35, disposed one above and one below the insulating rods. As illustrated, screws 36 pass through the gusset plates and through the insulating rods 34a and 34b, one screw on either side of the horizontal mast 21. To further support the insulating elements 34a and 34b, a plurality of screws 37 are provided which pass through the gusset plates, but not through the insulating rods 34a and 34b. Hence, one of the screws 37 may be removed on each side of the horizontal mast 21 whereby the insulating supports 34a and 34b and the associated reflectors 25a and 25b may be pivoted about screws 36 into parallel relationship with the horizontal mast 21, thereby greatly reducing the bulk of the antenna for shipping or packing purposes. Any suitable means for supporting the reflector elements 25a and 25b from their associated insulating rods 34a and 34b, respectively, may be employed. As illustrated, the rods may be inserted as by a press fit within recesses defined in the ends of rods 34a and 34b remote from horizontal mast 21. The high band reflectors 25a and 25b are designed so each is at least a half wave length long or preferably slightly longer than a half wave length for the high frequency television band in order that they may be inductive and carry lagging currents with respect to what they would carry if resistive. Due to the phase angle of the mutual impedance between these reflectors 25a and 25b and the fed element group 24, these reflectors carry currents that lead the fed element group current when the antenna is used as a transmitting antenna and, therefore, cause the radiation to be greatest in the direction of the transmitting station. The elements 25a and 25b have a negligible effect for the low frequency television band, because they are so much shorter than a half wave length. Hence, their capacitive reactance is so high that they conduct very little current. In other words, for the low frequency television band, the elements 25a and 25b are effectively not present as far as any result therefrom is concerned.

In accordance with the present invention, the antenna 20 includes as the important element thereof the fed element group 24 which by itself may provide a very satisfactory antenna. As best shown in Fig. 3 of the drawings, the fed element group 24 is designed to be 1.5 wave lengths long for the high frequency television band and 0.5 wave length long for the low frequency television band. Essentially, the fed element group 24 comprises tubular conductors 40a and 40b supported from the horizontal mast 21, which have associated with their outer ends insulating plugs 41a and 41b. Radiator elements 42a and 42b are supported from the insulating plugs 41a and 41b. These radiator elements are connected by fine wire conductors 43a and 43b, disposed coaxially with the respective tubular conductors 40a and 40b, with terminals 44a and 44b suitably supported on the fed element group 24. Effectively, the tubular conductors 40a and 40b and the fine wires 43a and 43b disposed therein each comprise a short length of coaxial cable.

It is well known that the characteristic impedance of a coaxial cable depends on the ratio of the inner diameter of the outer conductor of the cable to the diameter of the center conductor. For reasons which will become apparent as the following description proceeds, it is desirable for this characteristic impedance to be high and hence the wires 43a and 43b are preferably formed of a fine wire such as a wire having a diameter of .020″ whereby the tubular conductors 40a and 40b may have a reasonable diameter of the order of one inch, thereby providing a satisfactory mechanical construction and still affording the desirable high characteristic impedance.

It will be understood that the radiators 42a and 42b may be made of any suitable conducting material. Since it is desirable to solder the fine wires 43a and 43b, respectively, thereto, the radiators 42a and 42b in one embodiment, constructed in accordance with the present invention, were made of steel. Aluminum, except for the soldering problems, would be preferable since painting or other weather resisting coatings would be unnecessary, whereas with steel radiators it is desirable to coat them with a suitable weather resistant coating.

To support the radiators 42a and 42b, the insulating plugs 41a and 41b are illustrated as being inserted into the ends of the tubular conductors 40a and 40b which are preferably aluminum tubes and the radiators 42a and 42b are press-fitted or otherwise secured in suitable recesses defined in the insulating plugs 41a and 41b. The adjacent inner ends of the tubular conductors 40a and 40b are closed by insulating plugs 45a and 45b, respectively, which serve to support terminals 44a and 44b. For the purpose of supporting the fed element group 24 from the horizontal mast 21, a pair of upper and lower gusset plates 47 and 48, respectively, are employed. Screws 49 are illustrated as passing through the gusset plates and through the adjacent ends of the tubular conductors 40a and 40b, as well as through the plugs 45a and 45b. Additional screws 52 extending through the gusset plates 47 and 48 on either side of the tubular members 40a and 40b are provided to complete the supporting means for the fed element group 24 relative to the mast 21 which construction is the same as that already described with respect to the reflectors 25a and 25b. It will be understood that one of the screws 52 on each side of the horizontal mast 21 may be removed whereby the two portions of the fed element group 24 disposed on opposite sides of the horizontal mast 21 may be pivoted about screws 49 to a position parallel with the horizontal mast 21. The insulating plugs 45a and 45b have openings therein perpendicular to the longitudinal axes of the tubular conductors 40a and 40b and support therein suitable conducting terminals 44a and 44b which preferably extend through openings defined in the tubular members 40a and 40b, respectively. The conducting terminals may, for example, comprise bolts for additionally supporting a matching network described hereinafter and electrically connecting it to the fed element group. The inner ends of the fine wires 43a and 43b are suitably fastened as by soldering or the like to the terminals 44a and 44b.

For the purpose of supporting the fine wires 43a and 43b so as to remain centered within the respective tubular conductors 40a and 40b, suitable insulating dowel members 53a and 53b, respectively, are employed. The ends of these dowel members are supported in suitable recesses defined in the plugs 41a, 41b, 45a and 45b. Preferably, the insulating dowels 53a and 53b are formed of wood provided with a suitable slit therein to receive the fine wires 43a and 43b. To maintain the characteristic impedance high, it is desirable that no high dielectric material be disposed within the tubes 40a and 40b and it is for this reason that the small dowels 53a and 53b are employed. The characteristic impedances of the elements made up of the two transmission line sections comprising the fine wire portions 43a and 43b for the values mentioned above is of the order of 230 ohms and for the high frequency television band are each a quarter wave length long.

Figure 2:
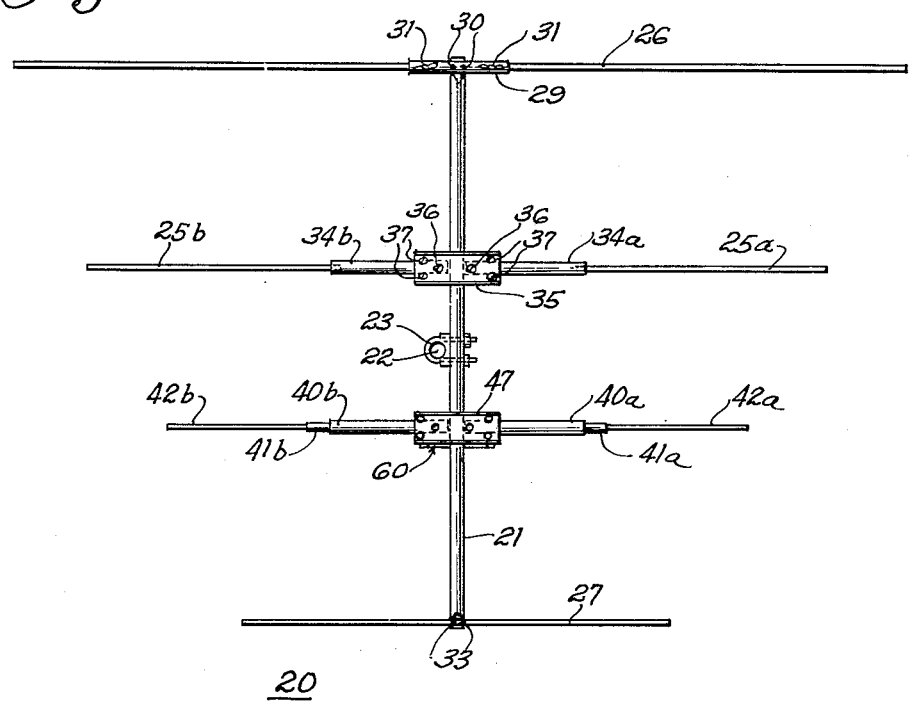
Fig. 2 is a top plan view of the antenna of Fig. 1.
Figure 7:
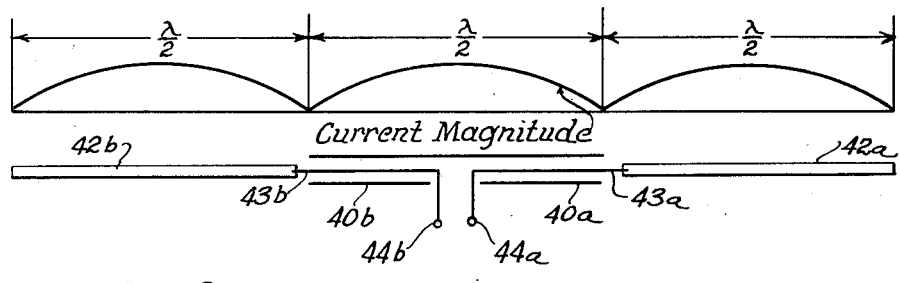
Figs. 7, 8 and 9 are schematic diagrams to aid in understanding the antenna of the present invention when operated on the high television band.
Figure 8:
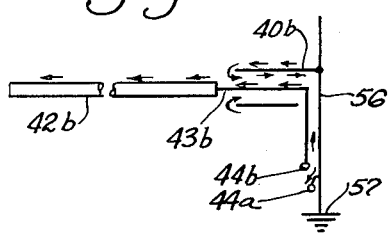
Figure 9:
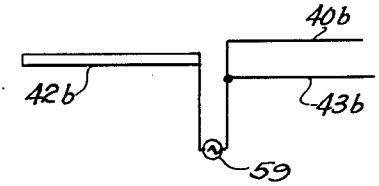

The operation of the fed element group 24 which may be used by itself as an antenna or which may be used in the array or beam of Figs. 1 and 2 may best be understood by reference to Figs. 7, 8 and 9. Fig. 7 shows the fed element group 24 with the corresponding parts thereof designated by the same reference numerals as in the other views of the drawings and with the current distribution curve associated therewith. This indicates that the fed element group 24 for the high frequency band in effect comprises three elements colinearly arranged, the radiator elements 42a and 42b comprising two of the three elements and the transmission line made up of the outer tubes 40a and 40b and the inner central conductors 43a and 43b comprising the third element. Each of these elements is effectively a half wave length long as indicated schematically in Fig. 7 and, moreover, in the high frequency television band, the currents in each element are in phase and equal. In the low frequency television band, the fed element group 24 is quite different in its operation from that shown in Fig. 7 and becomes a single half wave dipole with approximately the sinusoidal current distribution of a thin half wave dipole.

A simplified circuit of one half of the fed element group 24 is shown in Fig. 8 of the drawings where the outer conductor 40b, the radiator 42b and the fine wire inner conductor 43b are illustrated. The terminal 44b is also illustrated. Since the inner end of the tubular conductor 40b is grounded to the horizontal mast 21, this is indicated by the connection 56 and ground 57 of Fig. 8. The other terminal 44a is shown connected to this ground. So far as the terminals are concerned, the arrangement shown in Fig. 8 comprises two sections connected in series. The arrows in Fig. 8 indicate the directions of current flow. It is noted that the current flow on the inside surface of the tubular conductor 40b is in opposite direction to the current flow in the center or coaxial conductor 43b within tube 40b, but equal with it in magnitude. Consequently, there is no radiation from the currents enclosed within the tube 40b and only from the currents flowing along the outer surface of the tube 40b. The current on the outer surface of tube 40b is equal in magnitude to the current flowing in radiator element 42b and in phase with it, the entire fed element 24 acting like three colinear half wave elements connected in series and carrying equal in phase currents as indicated in Fig. 7. This may better be understood by considering that the fed element of the antenna acts as an element with a generator connected into it at the junction between the conductor 43b and the radiator element 42b. This generator is represented by the reference numeral 59 in Fig. 9 of the drawings. The current flowing in one terminal of the generator 59 must obviously equal the current flowing out of the other terminal. This means that the three currents flowing in the three sections of the fed element group 24 must be equal and in phase regardless of the influence of surrounding objects and regardless of frequency. This is a very desirable feature since it permits the fed element group 24 to be placed in an array without any danger of mutual impedances with other elements altering the desired relative currents of the three sections of the fed element group 24. Moreover, the independence of frequency makes it a very broad band element.

As was mentioned above, in the lower frequency television band, the total length of the three sections of the fed element group 24 is approximately one half wave length and the current distribution is the same as that for a half wave dipole.

Figure 10:
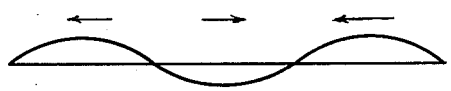
Figs. 10 and 11 are curve diagrams to aid in understanding the present invention.
Figure 11:
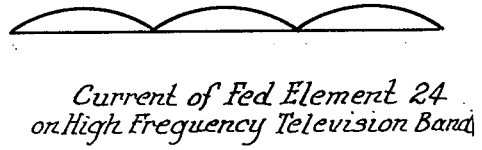
Figure 12:
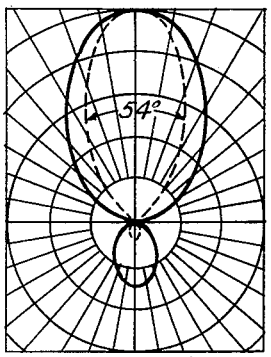
Figure 13:
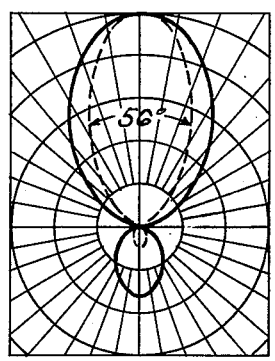
Figure 14:
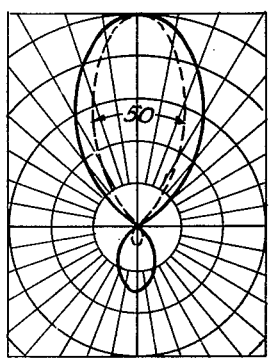
Figure 15:
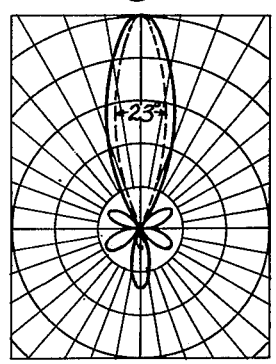
Figure 16:
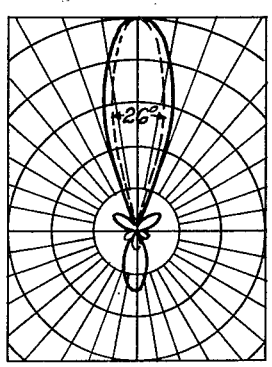
Figure 12:
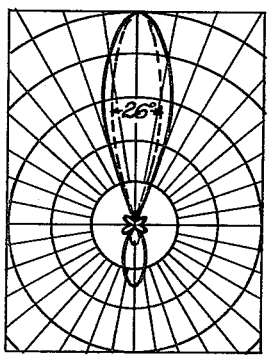

Fig. 10 represents the current distribution in a conventional one and half wave length dipole which indicates that the current at the center portion is equal but out of phase with the currents at the end portions. This may be contrasted with Fig. 11 showing the current distribution in the fed element group 24 as comprising equal in phase currents in all three sections thereof.

It is known that the impedance of an end fed half wave dipole at resonance when the dipole is slightly shorter than a half wave length is a resistive impedance and furthermore has a high magnitude. The tubular conductors 40 containing the relatively fine conductors 43 act as coaxial transmission lines of one quarter wave length for the high frequency television band. The input impedance of a quarter wave length transmission line may be expressed by the following equation:

$$Z_i = \frac{Z_0^2}{Z_L}$$

where $Z_0$ is the line characteristic impedance, $Z_L$ the load impedance and $Z_i$ the input impedance. It is, therefore, very desirable and, in fact, essential that $Z_0$ be large in order that the input impedance of the antenna not be undesirably small.

Without more, the antenna thus far described will have an input impedance $Z_i$ at the terminals 44 which is higher than 300 ohms in magnitude and capacitive at the upper end of the low frequency television band. At the lower portion of the high frequency television band, the input impedance $Z_i$ is also higher than 300 ohms but inductive. For the purpose of providing a better impedance match with a 300 ohm transmission line, there is provided in accordance with the present invention a simple network connected in series with the fed element group 24. This network is inductive at the high frequency end of the low frequency television band and capacitive at the low frequency end of the high frequency television band. The reactance of this network decreases to negligible values for the rest of these two television frequency bands and comprises a parallel resonant circuit resonant at a frequency between the two television bands. Two such resonant circuits are required, one in each lead leg, to maintain antenna balance. In Fig. 6 of the drawings there is illustrated schematically the matching network 60 comprising two parallel resonant circuits 60a and 60b connected to the terminals 44a and 44b, respectively.

In accordance with the present invention, these networks 60a and 60b are formed in an inexpensive manner of simple punch press parts and are adapted to be mounted directly to the terminals 44a and 44b. The structure furthermore is completely self-supporting and is much less expensive than the cost of a single fixed condenser of the type which would otherwise have to be employed. As illustrated, the networks 60a and 60b each include one turn coils made up of flat punchings 65 and 66. Each punching 65 is an L-shaped punching including an angular extension 65a in the same plane of the punching as clearly shown in Fig. 4 of the drawings. The punchings 66 are U-shaped punchings. A closed coil is made by riveting adjacent arms of the punching 65 and 66 together as indicated at 67. The other portions of the punchings are overlapped and have interspersed therebetween an insulating member or plate 68. This insulating plate 68, which may be formed of polystyrene or any other insulating material, provides a dielectric for a capacitor, designated as 69 in Fig. 6 of the drawings, defined by the overlapped ends of the punchings 65 and 66 separated by the plate 68. A single plate 68 forms the dielectric for the capacitor of both networks 60a and 60b and hence causes the two network sections to be mechanically joined into an integral unit as clearly shown in Fig. 5 of the drawings. Preferably, rivets 70 passing through the overlapped ends of punchings 65 and 66 and plate 68 clamp them all together and complete the one turn coils schematically indicated at 71 in Fig. 6 of the drawings. For additional capacitance, additional plates 72 may be employed effectively to provide each capacitor 69 with a third condenser plate. A second insulating plate 73 provides the dielectric between plates 72 and the adjacent portions of punchings 65. Moreover, this plate 73, like insulating plate 68, mechanically unites the two networks 60a and 60b. The angularly disposed portions 65a may be provided with openings 74 for fastening the same to the terminals 44a and 44b of the fed element group 24, as indicated in Fig. 1 of the drawings. Terminals 75a and 75b are provided on the matching network 60 for connection to the receiver transmission line 76 indicated in Fig. 1 of the drawings. Since the matching networks 60a and 60b are parallel resonant circuits resonant at a frequency between the two television bands, they act as wave traps to remove signals generated in the frequency range between the high and low television bands which might get into the receiver by means of cross modulation and receiver local oscillator harmonic conversion and hence serve an additional function.

In view of the detailed description included above, the operation of the antenna array 20 or the fed element group 24 if used alone will readily be understood by those skilled in the art. In Figs. 12 to 17 inclusive are shown measured reception patterns of the antenna of the present invention for the twelve presently established television channels. The dotted line curves in each figure represent the same pattern drawn on power scale. It is noted that the antenna is unidirectional and the reception pattern is fairly uniform for all channels. Moreover, for the high frequency television band, the antenna gain is nearly ten decibels over a conventional half wave dipole while for the low frequency television band, the gain is of the order of six decibels with reference to a half wave dipole. This gain for both frequency bands is clearly evident from Fig. 18 of the drawings where the curve M represents the decibel gain for the low frequency television band and the curve N represents the gain over a half wave dipole for the high frequency television band. It is noted that these gain curves are relatively flat over the entire range.

Figure 19:
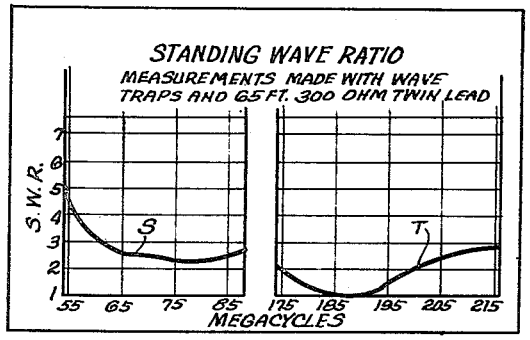

In Fig. 19, there is illustrated the standing wave ratio of the antenna of the present invention, the curve S representing the standing wave ratio for the low frequency television band and the curve T the standing wave ratio for the high frequency television band. The conditions under which measurements were made are set forth in Fig. 19. This standing wave ratio is the measurement of mismatch between the antenna and transmission line and is equal to unity when the line is perfectly matched. In view of the above discussion, it will be apparent that there has been provided an improved television antenna which in a single bay incorporates seven elements which cooperate to produce a substantial gain over antennas employed heretofore for all presently assigned television channels and which furthermore can be manufactured in a simple and inexpensive manner from tubes, rods, insulators and simple punch press parts. Furthermore, a good impedance match with a 300 ohm transmission line is obtained for both television bands. The fed element group 24, moreover, by itself provides an extremely economical television antenna being fully as good as a half wave dipole in the low frequency television band and having a six decibel gain over a half wave dipole in the high frequency television band.

While there has been illustrated and described a specific embodiment of the present invention, it will be understood that various changes and modifications will occur to those skilled in the art, and it is aimed in the appended claims to cover all such changes and modifications as fall within the true spirit and scope of the present invention.

What is claimed as new and desired to be secured by Letters Patent of the United States is:

1. In a multifrequency antenna, an element comprising three serially connected sections including a pair of single conductor radiator sections and an interposed section comprising a coaxial cable in the form of an outer conducting sheath and a centrally disposed fine wire conductor insulated from said outer sheath, said element for a particular frequency having a dimension of one and one half wave lengths with each section one half wave length long and each of said sections carrying equal in-phase currents, said pair of radiator sections being connected to the coaxial cable section only by said centrally disposed fine wire conductor.

2. In a multifrequency antenna, an elongated element comprising a pair of single conductor end radiator sections and a pair of interposed coaxial cable sections all disposed in end to end relationship, said interposed coaxial cable section comprising an outer conducting sheath and a central conductor insulated from said sheath, and a matching network supported from said antenna comprising a plurality of punchings arranged in the form of a coil with the ends separated to define a capacitor.

3. In a multifrequency television antenna for use in both television bands, an elongated element comprising a pair of single conductor end radiator sections and a pair of interposed coaxial cable sections all disposed in end to end relationship, and a matching network mechanically supported from said antenna comprising a plurality of punchings of conducting material arranged in the form of a one turn coil, an insulating plate interposed between the ends of said one turn coil to define a capacitor for said matching network, said matching network being resonant at a frequency between said television bands.

4. An antenna comprising a pair of tubular conductors supported in coaxial alignment with the adjacent ends thereof spaced apart but electrically interconnected, means for supporting a pair of rigid radiators in insulated and end to end relationship with respect to the non-adjacent ends of said tubular conductors, said radiators having their longitudinal axes disposed in coaxial relationship with said tubular conductors, a pair of terminals supported in insulated relationship with the adjacent ends of said tubular conductors, a pair of conductors of relatively fine wire one disposed in each of said tubular conductors to form with the associated tubular conductor a coaxial cable, means for supporting said fine wire conductors centrally of the associated tubular conductors, means including said wire conductors for connecting said radiators to said terminals, and a matching network connected to said terminals and physically supported thereby.

5. An antenna comprising a pair of tubular conductors supported in coaxial alignment with the adjacent ends thereof spaced apart but electrically interconnected, means for supporting a pair of rigid single conductor radiators in insulated and end to end relationship with respect to the non-adjacent ends of said tubular conductors, said radiators having their longitudinal axes disposed in coaxial relationship with said tubular conductors, a pair of terminals supported in insulated relationship with the adjacent ends of said tubular conductors, a pair of conductors of relatively fine wire one disposed in each of said tubular conductors to form therewith a coaxial cable, and means including said wire conductors for connecting said radiators to said terminals.

6. An antenna comprising a pair of tubular conductors supported in coaxial alignment with the adjacent ends thereof spaced apart but electrically interconnected, means for supporting a pair of rigid single conductor radiators in insulated and end to end relationship with respect to the non-adjacent ends of said tubular conductors, said radiators having their longitudinal axes disposed in coaxial relationship with said tubular conductors, a pair of terminals supported in insulated relationship with the adjacent ends of said tubular conductors, a pair of conductors of relatively fine wire one disposed in each of said tubular conductors to form therewith a coaxial cable, means including said wire conductors for connecting said radiators to said terminals, and dowel means for supporting said wire conductors centrally of said tubular conductors.

7. A multifrequency television antenna having an element comprising three serially connected sections including a pair of single conductor radiator sections and an interposed section comprising a coaxial cable, said coaxial cable including a fine wire central conductor, said pair of radiator sections being connected to the coaxial cable section only by said fine wire central conductor, said element for the high frequency television band having a dimension of one and one half wave lengths with each section one half wave length long, each of said sections carrying equal in-phase currents, said element for the low frequency television band functioning as a half wave dipole, a matching network mechanically supported and electrically connected to said element, and means for connecting a transmission line to said network and hence to said element.

8. A multifrequency antenna array providing a high gain over a half wave dipole when employed as a television antenna, including a fed element group comprising three colinear elements including a central coaxial cable section and a pair of end radiator sections, said group being fed with equal in-phase currents for a first television band comprising one range of frequencies, a pair of colinear reflectors disposed in spaced parallel relationship with said fed element group and cut for said first television band, an additional reflector active in both said first television band and a second lower frequency television band, and a director effective only in said second television band, said additional reflector and director being disposed in spaced parallel relationship with said fed element group and said reflectors.

9. A multifrequency television antenna array providing a high gain over a half wave dipole when employed as a television antenna, including a fed element group comprising three colinear elements fed with equal in-phase currents for the high frequency television band and functioning as a half wave dipole for the low frequency television band, the center of said three colinear elements effectively comprising an outer tubular conductor and a centrally disposed fine wire conductor, a plurality of parasitic elements including a pair of colinear reflectors disposed in spaced parallel relationship with said fed element group and cut for the high frequency television band within the range of 174 to 216 megacycles, an additional reflector active in both the high frequency and the low frequency band within the range of 54 to 88 megacycles, and a director effective in the low frequency television band, said reflectors being disposed on one side of said fed element group and said director being disposed on the opposite side, said additional reflector and director being disposed in spaced parallel relationship with said fed element group and said reflectors.

References Cited in the file of this patent

UNITED STATES PATENTS

| Number | Name | Date |
|---|---|---|
| 2,122,893 | Roosenstein | July 5, 1938 |
| 2,158,376 | Moser et al. | May 16, 1939 |
| 2,175,363 | Roberts | Oct. 10, 1939 |
| 2,199,050 | Jenkins | Apr. 30, 1940 |
| 2,201,857 | Dome | May 21, 1940 |
| 2,234,293 | Usselman | Mar. 11, 1941 |
| 2,287,220 | Alford | June 23, 1942 |
| 2,486,597 | Greene | Nov. 1, 1949 |
| 2,490,957 | Gluyas, Jr. | Dec. 13, 1949 |
| 2,551,664 | Galper | May 8, 1951 |
| 2,582,634 | Jones | Jan. 15, 1952 |
| 2,635,187 | Dorne | Apr. 14, 1953 |